June 21, 1932.   B. L. QUARNSTROM   1,863,873
METHOD OF MAKING TUBES
Filed July 15, 1929
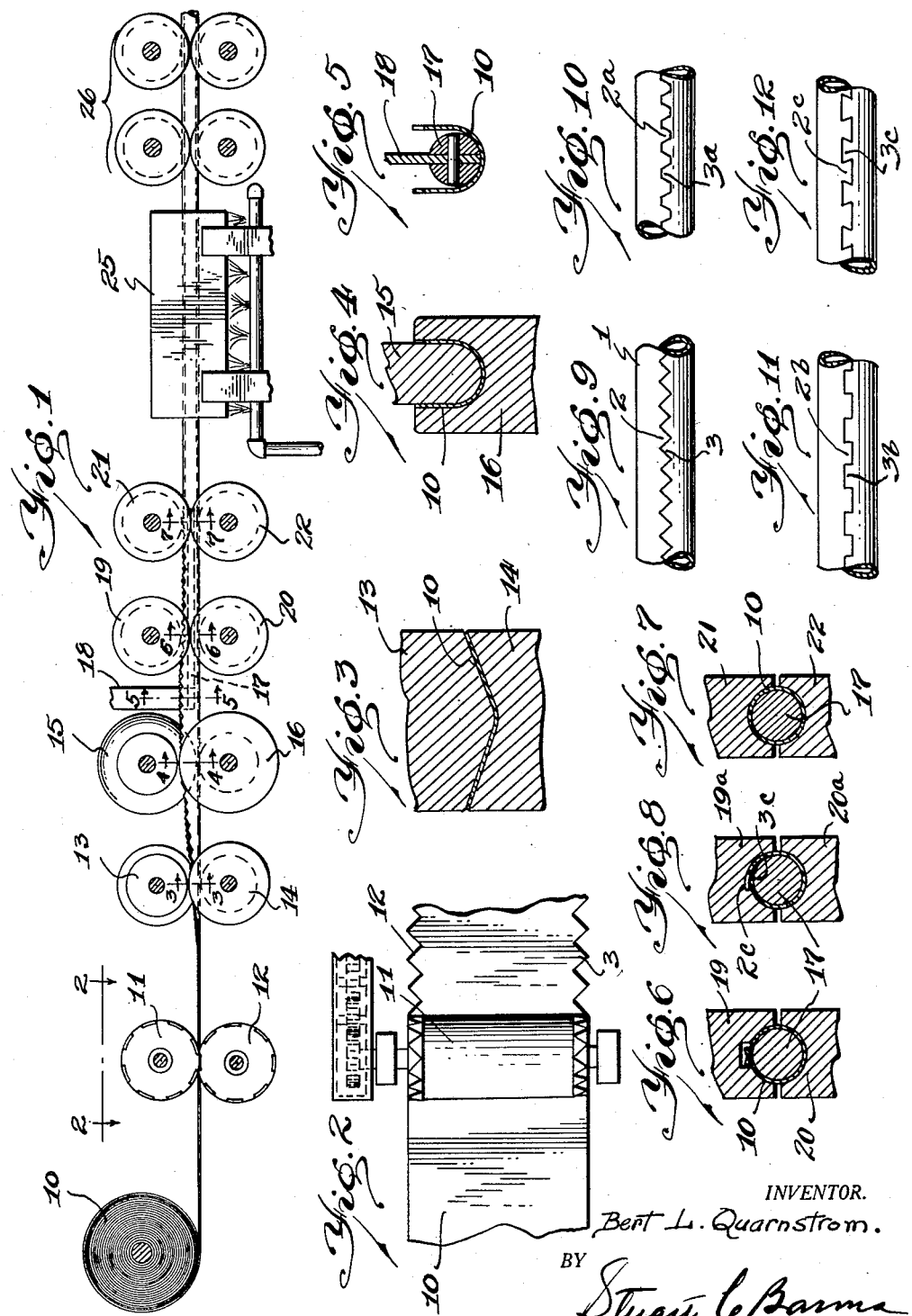
INVENTOR.
Bert L. Quarnstrom.
BY
ATTORNEY.

Patented June 21, 1932

1,863,873

UNITED STATES PATENT OFFICE

BERT L. QUARNSTROM, OF GROSSE POINTE PARK, MICHIGAN, ASSIGNOR TO BUNDY TUBING COMPANY, OF DETROIT, MICHIGAN, A CORPORATION OF MICHIGAN

METHOD OF MAKING TUBES

Application filed July 15, 1929. Serial No. 378,303.

The subject matter of this invention is a method of making a tube.

The invention is concerned principally with a tube especially adapted for use as a mechanical element, or a structural member. There are many places where a tube is useful as a mechanical element; one place is where a tube is used as a torque member, wherein a handle, lever, or the like may be secured to one end to rock the tube so that the same actuates a mechanism from a point longitudinally remote from the handle. A specific example is in an automotive vehicle where a controlling lever is mounted on the steering wheel for actuating a mechanism at the lower end of the steering post, or thereabouts, and the connecting element is a tube. As a structural member, the tube can be used as a cross support for the frame of the vehicle, or for horizontal or vertical supports for headlights or other devices. These are examples only.

A tube for such a use is one which should possess strength to take torque and twisting strains that are required of it, although the tube not necessarily need be made of the construction to provide for a secure fluid seal. According to the invention, a tube is contemplated which can be cheaply made, as a tube with a longitudinal seam, wherein the seam is so constructed as to not give way when the tube is subjected to a torque or other twisting strains. Accordingly, the longitudinal edges of a strip of stock from which the tube is made, provided with interfitting irregularities or alternating ridges and furrows of which several specific forms may be employed, such as the ones shown in the drawing attached hereto. The edges which are connected to provide this seam may be soldered together or secured together, as by means of brazing or copper welding, or welding the metal of the stock forming the tube.

In the accompanying drawing:

Fig. 1 is a side elevational view showing a somewhat diagrammatical view of an apparatus and method, by means of which a tube constructed in accordance with this invention can be made.

Fig. 2 is a view showing the cutter wheels for cutting the edges of the strip stock.

Figs. 3 to 7 inclusive are sectional views taken on the corresponding sectional lines of Fig. 1, illustrating various details of the mechanism, and of the steps employed in making the tube.

Fig. 8 is a sectional view similar to that of Fig. 6, illustrating a modified way of interfitting the edges of the strip stock, wherein the edges are provided with a peculiar shape, such as the shape illustrated in Fig. 12.

Fig. 9 is a view illustrating a tube showing one form of seam.

Fig. 10 is a view showing a modified form of seam.

Fig. 11 is a view of the tube, illustrating a seam provided by square ridges and furrows in the fitted-together edges of the stock.

Fig. 12 is a similar view illustrating a dovetail connection.

A tube is illustrated at 1 (Fig. 1), which is made from a strip of stock, the longitudinal edges of which are provided with alternating ridges and furrows and fitted-together as shown. In this form, the longitudinal edges are, what may be termed serrated, so as to have alternating and fitted-together points 2 and 3. In Fig. 10, the alternating ridges and furrows are modified in form so that they are not so sharp, as that shown in Fig. 9. These are illustrated at 2a and 3a. In Fig. 11 the alternating parts adapted to be fitted together, are square in shape, that is, their ends and side edges are at right angles, as illustrated at 2b and 3b. As shown in Fig. 12, the fitting projections are shaped to provide a dovetail fit, these projections being shown at 2c and 3c.

As before mentioned, this tube is made from a strip of stock which is rolled up transversely into tube form, the edges being secured together by a longitudinal seam. A suitable supply of strip stock is rolled up as at 10; the stock is drawn therefrom, and the edges of the stock are cut by punch die rollers 11 and 12. These rollers have appropriately shaped male and female cutting members for cutting out the shape in the edges of the stock. Where thin stock is used, one roller can be arranged to do the cutting against another roller in the nature of a platen having a relatively hard surface such as hard rubber or the like, against which the stock is cut. Following this cutting of the stock, the same is rolled transversely by a battery of forming rollers; the first two opposed rollers, 13 and 14, shaping the stock substantially as shown in Fig. 3; the second two, 15 and 16, shaping the stock substantially as shown in Fig. 4. At this point, an arbor may be employed, as illustrated at 17, the same being carried by a bracket 18.

The next pair of rollers, 19 and 20, cause the edges to move together substantially as illustrated in Fig. 6, while the final pair of rollers, 21 and 22, cause the final shaping of the tube as shown in Fig. 7.

The interfitted edges of the tube are now secured together, as by means of solder, copper welding, brazing, or the welding of the metal stock itself. As shown herein, the strip of stock may be tinned previous to being used, so that all that is required is to direct the formed tube through a suitable heating die 25, which causes the tin, or solder, to become molten and flow in between the edges of the stock and secure the same together. Final shaping rollers 26 may be used to more or less compress the tube together and hold it in its final shape during the cooling of the molten solder. Any other suitable connecting device may be used; for instance, an electric resistance welding machine may be employed, or a furnace may be used for copper welding, or otherwise welding the edges together. These devices in themselves form no part of the invention, and it is not necessary to show them.

In the event of making a tube of the nature shown in Fig. 12, wherein there is a dovetail arrangement, rollers 19a and 20a are employed at a position similar to that of rollers 19 and 20, and these rollers are shaped so as to lap the parts 2c and 3c over each other so that they are separated radially, as shown in Fig. 8. The final pair of rollers, 21 and 22 interfit the parts together by relative radial movement, as distinguished from the manner in which the serrated edges are secured together.

The tube can be made of any size desired, and of stock of various thicknesses, in order to meet various requirements to be placed upon the tube. When a tube constructed in accordance with this invention is subjected to strains or torque, the interfitting projections abut against each other and efficiently resist the strain so that the seam will not open up. As a result, a single walled tube with a longitudinal seam is rendered efficient for the purposes specified herein.

I claim:

1. The method of making a longitudinally butt seamed torque resisting tube which comprises, moving a strip of stock longitudinally, cutting the edges of the strip while the same is moving to form alternating ridges and furrows, bending the tube transversely into hollow cross sectional form, matching the ridges and furrows of the opposed edges, fitting the ridges and furrows together while the strip is moving and then securing the longitudinal seam formed by the interfitting ridges and furrows together by a molten sealing metal.

2. The method of making a tube having a longitudinally extending seam of the butt type comprising, substantially continuously moving longitudinally a strip of stock which is provided on each edge with alternating projections and recesses, with the projections and recesses being of dovetail formation, forming the strip stock into hollow cross sectional shape with one edge overlapping the other in a radially spaced manner, and then moving the edges radially with respect to each other to interlock the dovetail projections on one edge with the dovetail recesses in the other.

3. The method of making a tube having a longitudinally extending seam of the butt type comprising, substantially continuously moving longitudinally a strip of stock which is provided on each edge with alternating projections and recesses, with the projections and recesses being of dovetail formation, forming the strip stock into hollow cross sectional shape with one edge overlapping the other in a radially spaced manner, and then moving the edges radially with respect to each other to interlock the dovetail projections on one edge with the dovetail recesses in the other, and then securing the seam formed by the interlocked edges with molten sealing metal.

4. The method of making a longitudinally butt seamed torque resisting tube which comprises, moving a strip of stock longitudinally, cutting the edges of the strip while the same is moving to form alternating ridges and furrows, bending the tube transversely into hollow cross sectional form, matching the ridges and furrows of the opposed edges, and fitting the ridges and furrows together while the strip is moving.

In testimony whereof I affix my signature.

BERT L. QUARNSTROM.